United States Patent

Schmitt et al.

[15] 3,673,277

[45] June 27, 1972

[54] THERMOSETTING RESIN OF POLYAMIDE AND COPOLYMER OF POLYCARBOXYLIC ACID AND AN OLEFIN

[72] Inventors: Karl Schmitt, Herne; Fritz Guda, Wanne-Eickel; Siegfried Brandt, Herne, all of Germany

[73] Assignee: Scholven-Chemie Aktiengesellschaft, Gelsenkirchen-Buer, Germany

[22] Filed: June 3, 1969

[21] Appl. No.: 830,115

[30] Foreign Application Priority Data

June 5, 1968 Germany.....................P 17 69 515.7

[52] U.S. Cl..................260/857 UN, 260/78 R, 260/78.5 R, 260/829, 260/857 L
[51] Int. Cl.........................................................C08g 41/04
[58] Field of Search ..........................260/857, 857 U, 875 L

[56] References Cited

UNITED STATES PATENTS

| | | | |
|---|---|---|---|
| 3,236,914 | 2/1966 | Murdock | 260/857 |
| 2,557,808 | 6/1951 | Walker | 260/857 |

FOREIGN PATENTS OR APPLICATIONS

| | | | |
|---|---|---|---|
| 740,501 | 8/1966 | Canada | 260/857 |

OTHER PUBLICATIONS

Mark, Herman et al., Copolymerization, Interscience Publishers, New York 1952 page 45.
Taylor, Guy B. Viscosity and Molecular Weight of Nylon, pages 635– 638 March, 1947, Journal of the American Chemical Society.

*Primary Examiner*—Paul Lieberman
*Attorney*—Burgess, Dinklage & Sprung

[57] ABSTRACT

Thermosetting resin composition comprising:
a. as a first component, polyamide which is substantially non-crystalline and has an average molecular weight of less than 5,000,
b. as a second component, a copolymer of ethylenically unsaturated dicarboxylic acid, anhydride, partial ester, or partial amide thereof, mixture of two or more of the free acid, anhydride, partial ester and partial amide, and an olefin or ethylenically unsaturated ether or ester, or a mixture of two or more of said olefin, ether, or ester, the carboxyl group content of copolymer being 25–70 mole percent, the average molecular weight of the copolymer being less than about 5,000,
c. the weight percent of polyamide being 10–99 percent based on the polyamide plus copolymer.

Thermoset articles produced from the resin can be transparent. The thermosetting resin, thermoset articles, the thermoset resin and the process of producing the thermoset resin are claimed.

21 Claims, No Drawings

THERMOSETTING RESIN OF POLYAMIDE AND COPOLYMER OF POLYCARBOXYLIC ACID AND AN OLEFIN

BACKGROUND

The invention relates to articles and coatings made from thermosetting plastics which are manufactured by mixing together polyamides and polycarboxylic acids, followed by heating and forming.

Processes are known for the manufacture of thermoplastic articles and coating compositions by the reaction of polyamides with polycarboxylic acids. Those processes are based on the fact that it is possible by such a reaction to increase the viscosity of polyamides in the fused state. For example, the use of trimesinic acid (1,3,5-benzene tricarboxylic acid) and pyromellitic acid as polycarboxylic acids have been proposed in this connection.

Also in the prior art is the use of polymeric polycarboxylic acids to increase the viscosity in the fused state of polyamides of high molecular weight having intrinsic viscosities greater than 0.4. Polymeric polycarboxylic acids having up to 10 mole-percent acid groups are combined with polyamides according to W. German Pat. No. 1,241,606, to Green.

The use of polymeric polycarboxylic acids is of especial interest, because, on account of their high functionality, they lead rapidly to setting and to a certain stability of shape even at low transformation percentages. Their applications, however, are greatly limited by the fact that polymers of different composition are not compatible with one another and do not produce homogeneous mixtures. This is particularly the case with mixtures of polyamides and polycarboxylic acids.

THE INVENTION

It is the aim of the invention to prepare a thermosetting molding and coating compound from polyamides and polymeric carboxylic acids free of the disadvantages of the prior art materials. This composition is to be insoluble and infusible as well as transparent after thermal treatment.

The invention is based upon discovery that some polyamides are compatible with copolymers of olefinic dicarboxylic acids or their acid esters or amides, having 25 and more mole-percent of carboxyl groups. This percentage is on the basis of:

mole % COOH = $(n)/(a+nb) \cdot 100$ $a$ = mole olefin per recurring structural unit
$b$ = mole unsaturated dicarboxylic acid per recurring structural unit
$n$ = number of free COOH-groups of the unsaturated dicarboxylic acid, wherein one anhydride group includes two COOH-groups.

After the thermal treatment of the mixtures, clearly transparent, insoluble and infusible polyamides are obtained which have good mechanical properties when made into articles and coatings.

The articles and coatings according to the invention are obtained by mixing together and then heating a non-crystalline or only slightly crystalline polyamide or polyamide mixture which is soluble in solvents containing alcohol, and which has an average molecular weight of less than about 5,000, preferably less than about 3,000, better less than about 2,000, and a copolymer or copolymer mixture composed of (1) ethylenically unsaturated dicarboxylic acids or their anhydrides and/or partial esters and/or partial amides, and (2) polymerizable olefins and/or ethers and/or esters containing C—C double bonds. The copolymer has a carboxyl group content of about 25 to 70, preferably about 33 to 70 mole-percent, and an average molecular weight of less than about 5,000, preferably less than about 3,000, better less than about 2,000. The weight percentage of polyamide component in the mixture is to be from about 10 to 99 percent, and preferably from about 20 to 95 percent.

The molecular weights preferably do not exceed the stated limits because this would impair the properties of the hardened products as regards, for example, their hardness and their resistance to solvents.

Non-crystalline polyamides are obtained by methods known from the literature (see for example "Kunststoff-Handbuch," Vol. VI, "Polyamide," published by Vieweg-Mueller, 1966). As a rule, these polyamides are soluble in solvents containing alcohol.

Suitable for the process of the invention are, for example, mixed polyamides composed of straight-chained dicarboxylic acids, diamines and lactams, e.g., made from AH salt (the salt of adipic acid and hexamethylene diamine) and caprolactam in a ratio of 60 : 40; polyamides whose NH hydrogen is partially replaced by alkanol, e.g. methylol, or alkyl groups; polyamides of branched dicarboxylic acids and/or branched diamines, e.g., polyamides of 2,4,4-trimethyladipic acid or of 2,2,4-trimethylhexamethylene-diamine; polyamides and copolyamides containing alicyclic or aromatic dicarboxylic acids such as 1,4-cyclohexane dicarboxylic acid; and polyamides and copolyamides containing alicyclic or aromatic diamines having alkyl side chains, e.g. 1-amino-3-aminomethyl-3,5,5,-trimethylcyclohexane, known under the name of isophorone-diamine (hereinafter called IPD).

The copolymer component is prepared according to known methods by radical copolymerization of polymerizable olefin dicarboxylic acids or their derivatives, such as anhydrides, partial esters and partial amides, e.g., maleic acid, fumaric acid, itaconic acid, citraconic acid, with suitable olefins. The derivatives can also be prepared after the polymerization. By the copolymerization of maleic acid monomethyl ester with styrene, for example, a material can be made which is usable in the same manner as one prepared by the copolymerization of maleic acid anhydride with styrene followed by the semi-esterification with methanol. The dicarboxylic acids can contain four or five carbon atoms.

The comonomers can be polymerizable olefins, such as ethylene, propylene, isobutylene, vinyl compounds such as vinyl chloride, olefins having aromatic substituents such as styrne and $\alpha$-methylstyrene, cyclic olefins such as indene, acenaphtylene, ethylenically unsaturated polymerizable ethers such as methylvinyl ether and coumarone, unsaturated polymerizable esters such as vinyl acetate, vinyl propionate, acrylic acid ester and methacrylic acid ester.

The carboxyl group content in the copolymer amounts to 25 mole-percent and more, of the monomer mixture, and preferably 33 to 70 mole-percent (one acid anhydride group counting as two carbonyl groups).

The average molecular weights of the copolymers are preferably limited, as they are in the polyamide component. At molecular weights under 5,000, and preferably under 3,000, particularly hard cross-linked polyamides are obtained.

The articles and coatings according to the invention are manufactured by mixing the two components either directly or in solution, and forming them at temperatures up to about 180° C. The cross-linking reaction begins slowly at temperatures above 80° C, and progresses with adequate speed above about 110° C. The cross-linking temperature can be reduced by known acid and basic catalysts, such as sodium ethylate, phosphoric acid, and lead oxide.

The forming is performed by conventional methods, e.g., by pressing the mixture, which may be mixed with fillers if desired, while at the same time heating it, or by casting solutions in a sheet casting machine, or by spraying on solutions mixed, if desired, with pigments and fillers.

The cross-linking takes place when the articles and coatings are heated. The cross-linked polyamides are hard and tough as well as clearly transparent, and in the form of films and coatings they are also flexible.

The polyamides of branched dicarboxylic acids, e.g. 3-methyladipic-acid or 2,2,4-trimethyladipic-acid, or branched diamines e.g. 3-methylhexamethylendiamine, are characterized by high flexibility in the cross-linked state. Particularly outstanding characteristics have been obtained with polyamides of 2,4,4- and 2,2,4-trimethylhexamethylenediamine (TMD). In the case of sheet-metal coatings, the cupping values according to Erichsen (DIN 53156) are higher than 10, accompanied by good hardness and acid resistance. Flexibility and acid resistance are also elevated in copolyamides, the diamine component having a percentage of at least 10 mole-percent TMD.

Polyamides of cyclic dicarboxylic acids, e.g. cyclohexane-1,4-dicarboxylic acid or 1,4-dicarboxylmethyl-cyclohexane, and diamines are characterized in the cross-linked state by high hardness. Particularly good values have been achieved with polyamides of IPD, together with good ductility, along with resistance to alkalies as well as acids. Indentation resistance according to Buchholz (DIN 53153) is at least 125. IPD in copolyamides also improves the hardness of the cross-linked products, even when only 10 mole-percent of the amine component consists of IPD.

Among the copolymers used, those of maleic acid and its functional derivatives are characterized by a uniform and reproducible composition, and especially by their high reactivity. They are therefore used preferentially. Copolymers of styrene and maleic acid or derivatives thereof give the cross-linked polyamide greater hardness and solvent-resistance against alcohols, aromatic and aliphatic hydrocarbons, acetone, etc. From the manufacturing viewpoint, the alkyl semi-esters of alcohols up to $C_4$ which are soluble in solvents containing alcohol, are particularly advantageous, and have excellent compatibility with the polyamide component plus high reactivity.

One particular embodiment of the process according to the invention starts out with polyamides having mostly terminal $NH_2$ groups and molecular weights under 5,000, preferably under 2,000, and with copolymers of the above-described type, having molecular weights under 3,000, and preferably under 2,000. The two components in this case are in the form of salts and they react more rapidly with one another than mixtures with a less pronounced salt character.

Mixtures of the polyamide and copolymer can also be subjected to a brief preliminary condensation in solutions at elevated temperature. At temperatures of 100°–180° C., for example, a partial reaction takes place without setting within from 10 minutes to 4 hours, and at temperatures of 60° to 100° C. it takes place within one-quarter to 5 hours. In the case of varnish solutions, this improves the flow, and in the case of molded articles that are pressed from the reaction product when freed of solvent, the percentage of volatile reaction products which develop in the cross-linking reaction is decidedly reduced.

When the molecular weight of the polyamide component is under 3,000, preferably under 2,000, and that of the copolymer component is under 3,000, preferably under 2,000, the mixture, especially the precondensed mixture, when freed of solvent, is soluble or easily dispersable in water containing $NH_3$ or amine, and can be used as an aqueous varnish solution.

Not only pigments and fillers can be added to the mixtures of polyamides and copolymers of ethylene dicarboxylic acids according to the invention, but also other commonly known additives, such as antifoaming agents, flow-controlling agents, organic solvents, catalysts, etc.

EXAMPLE 1

Ninety weight-parts of a copolyamide of AH salt and caprolactam in a ratio of 60 : 40 are dissolved in 450 weight-parts of 85 percent methanol. Two hundred parts of kaolin flour are mixed into this solution in a hermetically sealed mixer, the solvent evaporating to such an extent that a viscous dough is produced. Then 10 parts of a copolymer of maleic acid and isobutylene in a 1 : 1 molar ratio in 20 parts of methyl ethyl ketone are added and mixed. A loose composition is obtained, which is further dried in a vacuum drying vessel. By pressing at 150° C., hard articles of high impact strength are obtained.

EXAMPLE 2

Sixty weight-parts of a polyamide prepared from adipic acid and 2,2,4-trimethylhexamethylenediamine, having an average molecular weight amounting to about 2,500, are dissolved in 80 parts of methanol. To this solution is added a solution consisting of 60 parts of a mixture of equal parts of ethanol and toluene and 40 parts of a copolymer of styrene and maleic acid monoethyl ester in a 1:1 ratio, having an average molecular weight of 1,500. The mixture is applied to a sheet of deep-drawing steel, which after air drying is heated for 1 hour at 130° C.

Cupping per DIN 53156: 10 mm
Indentation resistance per DIN 53153: 90
After 1 hour of exposure to 5 percent hydrochloric acid, the coating remains unaltered.

EXAMPLE 3

Seventy weight-parts of a polyamide prepared from equal parts of caprolactam, AH salt and adipic acid 4,4'-diaminodicyclohexamethylmethane, and having an average molecular weight of 4,500, are dissolved in 150 parts of a mixture of 70 weight-parts of methanol, 20 parts of benzene, and 10 parts of water. To this solution is added a solution composed of 45 weight-parts of a mixture of equal parts methanol and toluene and 30 parts of a copolymer of styrene and maleic acid anhydride in a molar ratio of 1 : 1, having an average molecular weight of 1,500. The solution is applied to a sheet of deep-drawing steel, which is heated for one half hour at 150° C.

Cupping per DIN 53156: 8.5 mm
Indentation resistance per DIN 53153: 100–110.
After exposure for 1 hour to 5 percent caustic soda solution, the coating swells slightly.

EXAMPLE 4

Seventy weight-parts of a copolyamide of decanedicarboxylic acid and a mixture of 33 mole-percent 1-amino-3-aminomethyl-3,5,5-trimethylcyclohexane and 67 mole-percent 2,2,4-trimethylhexamethylenediamine having an average molecular weight of 4,500 are dissolved in 110 parts of methanol. To this solution is added a solution composed of 45 weight-parts of a mixture of equal parts of methanol and toluene and 30 parts of a copolymer of styrene and maleic acid anhydride in a molar ratio of 1 : 1, having an average molecular weight of 1,500. The solution is applied to deep-drawing sheet steel which is heated for one half hour at 150° C.

Cupping per DIN 53156: 10 mm
Indentation resistance per DIN 53153: 125
After exposure for 1 hour to 5 percent caustic soda solution, the coating remains unaltered.

EXAMPLE 5

Fifty weight-parts of a polyamide prepared from decanedicarboxylic acid and 1-amino-3-aminomethyl-3,5,5-trimethylcyclohexane with an average molecular weight of 3,500 are dissolved in 75 parts of methanol. To this solution is added a solution composed of 75 weight-parts of a mixture of equal parts of methanol and toluene and 50 weight-parts of a copolymer of styrene and fumaric acid monomethyl ester in a molar ratio of 2 : 1. The solution is applied to deep-drawing sheet steel which is heated for 2 hours at 125° C.

Cupping per DIN 53156: 9.5 mm
Indentation resistance per DIN 53153: 125
After 1 hour of exposure to 5 percent soda lye, the coating remains unaltered.

EXAMPLE 6

Forty weight-parts of a polyamide prepared from azelaic acid and 2,2,4-trimethylhexamethylenediamine in which 90 percent of the terminal groups are $NH_2$ groups and whose average molecular weight amounts to 800, are dissolved in 60 parts of methanol. To this solution is added a solution of 60 weight-parts of a copolymer prepared from styrene and maleic acid monomethyl ester in a molar ratio of 1.5:1 and having an average molecular weight of 1,500 in a solvent as is used in Example 4. The solution is heated for 10 minutes at 120° C., pigmented after cooling with titanium dioxide, and applied to deep-drawing sheet steel which is heated for one half hour at 140° C.

Cupping per DIN 53156: 8.5 mm
Indentation resistance per DIN 53153: 125

EXAMPLE 7

Fifty-five weight-parts of a copolyamide prepared from decanedicarboxylic acid and 2,4,4-trimethylhexamethylenediamine having 95 percent $HN_2$ terminal groups and an average molecular weight of 1,000 are dissolved in 80 weight-parts of methanol. To this solution is added a solution composed of 70 weight-parts of a mixture of equal parts of methanol and toluene and 45 parts of a copolymer of styrene and maleic acid monomethyl ester in a 1:1 molar ratio having an average molecular weight of 1,200. The solution is heated for one half hour at 90° C. and then vacuum dried at 40° to 50° C. The dry substance is dissolved in a mixture of 170 weight-parts water, 22 parts 10 percent ammonia solution and 10 parts propylene glycol-1,2, and, after filtration, applied to deep-drawing sheet steel which is heated for half an hour at 140° C.

Cupping per DIN 53156: 9.5 mm
Indentation resistance per DIN 53153: 125
Exposure for 1 hour to 5 percent hydrochloric acid leaves the coating unaltered.

EXAMPLE 8

Thirty parts by weight of a copolymerizate from itaconic acid anhydride and methacrylic acid methyl ester in the mole ratio of 1 : 1 are dissolved in 50 parts by weight of methyl ethyl ketone. To this solution, one adds 10 parts by weight of a 50 percent aqueous methyl amine solution. After stirring for 1 hour at 50° C., there are added 100 g of a 40 percent solution in ethanol of a polyamide produced from 5 moles 2,2,4-trimethyladipic-acid and 6 moles 2,4,4-TMD. Thereafter, the mixture is heated for 1 hour, under turbulent stirring, to 70° C. and is then used for saturating of wood chips having a length of 3 – 5 mm. In vacuum, the saturated wood chips are separated from the solvent. The resulting press mass is hardened by pressing in the mold at 160° C. The material is permeable to steam and is suited for the production of wall linings.

In the foregoing examples the acid component of the copolymer can be itaconic or citraconic, and the olefin component can be as is mentioned above and is preferably a hydrocarbon or an ethylenically unsaturated ester of up to 10 carbon atoms and of a monocarboxylic fatty acid. The olefin component can contain two to 14 carbon atoms.

What is claimed is:
1. Thermosetting resin composition comprising:
   a. as a first component, polyamide which is substantially non-crystalline and has an average molecular weight of less than 5,000,
   b. as a second component, a copolymer of monoethylenically unsaturated dicarboxylic acid, anhydride, partial ester, or partial amide thereof, mixture of two or more of the free acid, anhydride, partial ester and partial amide, and a monoolefin or monoethylenically unsaturated ether or ester, or a mixture of two or more of said olefin, ether, or ester, the carboxyl group content of copolymer being 25–70 mole percent, the average molecular weight of the copolymer being less than about 5,000,
   c. the weight percent of polyamide being 10–99 percent based on the polyamide plus copolymer.
2. Thermosetting resin composition according to claim 1, said polyamide being soluble in alcoholic solvent.

3. Thermosetting resin composition according to claim 1, the average molecular weight of said polyamide being less than about 3,000, the average molecular weight of the copolymer being less than about 3,000, said mole percent of carboxyl groups being about 33–70 percent, and said weight percent of polyamide being about 20–95 percent.
4. Thermosetting resin composition according to claim 2, said polyamide having branch substituents.
5. Thermosetting resin composition according to claim 2, said polyamide containing diamine residues, 10 to 100 percent of the diamine residues being residues of 2,4,4-and/or 2,2,4-trimethylhexamethylenediamine.
6. Thermosetting resin composition according to claim 2, said polyamide containing cyclic residues in the polymer chain.
7. Thermosetting resin composition according to claim 2, said polyamide containing diamine residues, said diamine residues being 10–100 percent residues of 1-amino-3-aminomethyl-3,5,5-trimethylcyclohexane.
8. Thermosetting resin composition according to claim 2, said copolymer being a copolymer of maleic acid, maleic anhydride, a partial ester of maleic acid and an alcohol of up to four carbon atoms, or a partial amide of maleic acid, or a mixture of two or more thereof.
9. Thermosetting resin composition according to claim 8, said copolymer being a copolymer of styrene.
10. Thermosetting resin composition according to claim 1, the polyamide terminal groups being mostly $NH_2$ groups.
11. Thermosetting resin composition according to claim 10, the average molecular weight of said polyamide and said copolymer being each less than about 2,000.
12. Thermosetting resin composition according to claim 1, said polyamide and said copolymer being partially condensed together.
13. Thermosetting resin composition according to claim 1, said resin being an aqueous ammonia or aqueous amine medium.
14. Shaped article formed of a cured, thermoset resin according to claim 1.
15. Thermoset resin which is the condensation product of the resin of claim 1.
16. Method of producing a thermoset resin which comprises condensing a resin according to claim 1.
17. Thermosetting resin composition according to claim 1, said copolymer being a copolymer of one or more of the group maleic acid, fumaric acid, anhydride and partial esters of maleic acid and fumaric acid.
18. Thermosetting resin composition according to claim 16, said copolymer being a copolymer of one or more of the group isobutylene and styrene.
19. Thermosetting resin according to claim 1, said polyamide being of a polyamide of the salt of adipic acid and hexamethylene diamine, adipic acid and 2,2,4-trimethylhexamethylenediamine, decanedicarboxylic acid and 1-amino-3-aminomethyl-3,5,5-trimethylcyclohexane and 2,2,4-trimethylhexamethylenediamine, decanedicarboxylic acid and 1-amino-3-aminomethyl-3,5,5-trimethyl cyclohexane, azelaic acid and 2,2,4-trimethylhexamethylenediamine, decanedicarboxylic acid and 2,4,4-trimethylhexamethylenediamine, or 2,2,4-trimethyladipic acid and 2,4,4-trimethylhexamethylenediamine.
20. Thermosetting resin according to claim 1, said polyamide being of a dicarboxylic acid and at least one of 2,4,4- and 2,2,4-trimethylhexamethylenediamine.
21. Thermosetting resin according to claim 20, said dicarboxylic acid having six to 12 carbon atoms.

* * * * *